United States Patent Office 3,068,202
Patented Dec. 11, 1962

3,068,202

PHOTOSENSITIVE POLYVINYL ACETALS

Marion Burg, Metuchen, N.J., assignor to E. I. du Pont de Nemours and Company, Wilmington, Del., a corporation of Delaware No Drawing. Filed Apr. 20, 1959, Ser. No. 807,316
11 Claims. (Cl. 260—66)

This invention relates to photosensitive polyvinyl acetals and to photosensitive elements comprising a support and a stratum comprising such an acetal. Still more particularly it relates to 4-formyl alkyl- or arylphenone polyvinyl acetals and to photosensitive elements having a stratum containing one or more of such acetals. The invention also relates to processes for producing relief images in such elements. The invention further relates to processes for making the aforesaid acetals.

An object of this invention is to provide the art with a new and useful class of photosensitive acetals. Another object is to provide photosensitive elements utilizing such acetals which are useful in various photomechanical processes to form relief images. A further object is to provide such acetals from commercially available chemical compounds and in a simple and dependable manner. A still further object is to provide photosensitive elements which can be readily exposed and developed to form relief images suitable for printing line and halftones. Additional advantages will be apparent from the following description of the invention.

The novel polyvinyl acetals of this invention contain a plurality of intralinear vinyl alcohol (—$CH_2$CHOH—) groups and a plurality of 4-formyl alkyl- or arylphenone acetal groups and may in addition contain other neutral ester, ether or acetal groups. The first-mentioned acetal groups can be represented by the formula

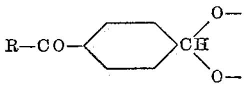

where the free bonds are attached to intralinear carbon atoms of the polyvinyl chain of atoms, R is, methyl; alkaryl, e.g., benzyl; aryl, e.g., phenyl and naphthyl; p-substituted phenyl, e.g., p-phenyl-, p-chloro-, p-sulfo- and sodium p-sulfo, p-alkoxy-, e.g., methoxy- and ethoxy-, and p-alkylphenyl, e.g., alkyl of 1 to 4 carbon atoms; alpha-chloronaphthyl, alpha-methoxynaphthyl and alpha-ethoxynaphthyl.

The compounds may contain 10 to 80%

—$CH_2$CHOH— groups, 5 to 75% of the 4-formyl phenone acetal groups and the remainder can be the other groups, e.g., acetate, or chloracetate groups or acetals from other aldehydes, e.g., formaldehyde, acetaldehyde, benzaldehyde, o-sulfobenzaldehyde or sodium o-sulfobenzaldehyde acetal groups. When the latter are present, a particularly useful group of acetals are provided. Photosensitive plates made from them have good water-development properties due to their enhanced water-soluble properties.

The foregoing photosensitive acetals of the invention can be readily prepared by reacting (*a*) polyvinyl alcohol and its derivatives containing free —$CH_2$CHOH— groups, e.g., a completely or partially hydrolyzed polyvinyl ester, a polyvinyl ether, a polyvinyl ether/ester or a polyvinyl acetal or mixed ester/acetal, etc. containing from 75% to 85% intralinear —$CH_2$CHOH— groups with (*b*) 4-formyl alkyl- or arylphenone or an acetal thereof with an alkanol of 1 to 4 carbons or with a 1,2- or a 1,3-alkanediol of 2 to 4 carbon atoms in the presence of (*c*) a condensation catalyst of acid reaction at a temperature up to about 50° C. until the acetal or acetal-interchange reaction is complete which usually requires from ¾ to 1.0 hours. Methanol, ethanol, isopropanol, butanol, ethylene glycol and 1,3-propylene glycol are suitable alkanols and alkanediols. Suitable condensation catalysts include strong mineral acids, e.g., phosphoric, hydrochloric, perchloric and sulfuric; organic acids, e.g., p-toluenesulfonic acid; and acid reacting salts, e.g., aluminium chloride and boron trifluoride. Catalytic amounts of these catalysts are used and the reaction can be carried out in suspension or solution, e.g., in organic or aqueous/organic solvent solution. In general the catlyst is present in an amount from 2% to 5% by weight of the acetalizing compound.

If desired two acetalizing agents may be present, the other being formaldehyde, acetaldehyde, benzaldehyde, sodium o-sulfobenzaldehyde or the corresponding acetals with the alkanols and alkanediols mentioned above.

In making photosensitive elements from the photosensitive acetals of the invention described above, a solution or dispersion thereof in a volatile solvent, e.g., ethanol, methanol or isopropanol, or mixtures thereof with water, is extruded or coated onto the surface of a support in the same way that photographic colloid-silver halide emulsions are coated. The layers are then dried. This is generally carried out with the substantial exclusion of actinic light.

These compositions may also contain a hydrogen donor compound in an amount from 5% to 40% by weight. Suitable donors include benzyl alcohol, methylphenylcarbinol, cyclohexanol, benzhydrol, diphenylmethane, ring substituted toluenes, 2-hydroxyethyl acetate, N-2-hydroxyethylformamide. In addition, hydroxy esters such as the half acetate ester of p,p′-dimethylolbenzene, diacetin, and 2-hydroxyethyl acetate are also useful. The hydrogen donor compounds may also act as plasticizers. The insolubilization reaction can occur in the presence of air.

Suitable base or support materials include metals, e.g., steel and aluminum plates, sheets and foils, and films or plates composed of various film-forming synthetic resins or high polymers, such as the addition polymers, including those mentioned later, in both monomeric and polymeric form for use in the photopolymerizable layer and in particular the vinylidene polymers, e.g., the vinyl chloride polymers, vinylidene chloride copolymers with vinyl chloride, vinyl acetate, styrene, isobutylene and acrylonitrile; and vinyl chloride copolymers with the latter polymerizable monomers; the linear condensation polymers such as the polyesters, e.g., polyethylene terephthalate; the polyamides, e.g., polyhexamethylene sebacamide; polyester amides, e.g., polyhexamethylene-adipamide/adipate; etc. Fillers or reinforcing agents can be present in the synthetic resin or polymer bases such as the various fibers (synthetic, modified, or natural), e.g., cellulosic fibers, for instance, cotton, cellulose acetate, viscose rayon, paper; glass wool; nylon, and the like. These reinforced bases may be used in laminated form.

Photosensitive elements of this type can be insolubilized to form printing elements in the presence of a hydrogen donor source by exposing to actinic radiation through an image-bearing transparency consisting solely of substantially opaque and transparent areas. The photosensitive layers are subsequently developed with hot water or an aqueous solution at room temperature, e.g., alcohol-water, 10 to 80/90 to 20 by volume, preferably 70/30 by volume; dilute alkali metal hydroxide solutions, etc., to remove that portion of the composition which was not exposed to the actinic radiation. Mixed polyvinyl acetals, those prepared from o-sulfobenzaldehyde and 4-formylbenzophenone ethylene glycol acetal, can be insolubilized and exposed by the procedures described above. The mixed polyvinyl acetals can be developed in a more dilute alcohol-water solution, e.g., 50/50 by volume, than described above. In addition, the mixed polyvinyl acetals are soluble in dilute alkali. The insolubilized layers after the unexposed portions are washed out have clear, tough images in the exposed areas and can be used as printing elements, resists or binders for pigments or other dispersed materials. Development usually is at room temperature.

In another embodiment a phosphor, e.g., zinc sulfide or zinc cadmium sulfide particles, can be added to the above compositions and the mixture insolubilized by exposure to actinic radiation and subsequently developed as described above.

The invention will be further illustrated but is not intended to be limited by the following examples.

EXAMPLE I

*4-Formylbenzophenone Polyvinyl Acetal*

A. *p-Benzoylbenzal diacetate.*—Six hundred grams (570 ml.) of glacial acetic acid, 612 g. (565 ml.) (6 moles) of acetic anhydride and 70.5 g. (0.36 mole) of p-methylbenzophenone (M.P. 55 to 58° C.) were placed in a 2 liter, 3-neck round-bottom flask fitted with a stirrer, thermometer and separatory funnel, the flask being cooled in an ice-salt bath. When the temperature reached −7° C., 85 ml. (1.5 moles) of concentrated sulfuric acid was slowly added to the stirred solution so that a temperature below 0° C. was maintained. Portions of 100 g. (1 mole) of chromium trioxide were then added over a period of about 1 hour so that the temperature was kept below 10° C. The mixture was stirred for 10 minutes, decomposed by pouring on ice and cold water added to bring the volume up to about 6 liters. The green solid which separated was recovered by filtration, was washed with $H_2O$ until the filtrate was colorless and was then slurried with 500 ml. of a cold 2 percent solution of sodium carbonate to remove any p-benzoylbenzoic acid.

Filtration, air-drying and recrystallization from alcohol afforded 47.5 g., 42.5% yield, of the diacetate, M.P. 78–83° C.

Five recrystallizations of the diacetate from ethanol afforded an analytical sample, M.P. 83.5–85° C.

*Analysis.*—Calc'd. for $C_{18}H_{16}O_5$: C, 69.22; H, 5.16. Found: C, 69.20, 69.43; H, 5.29, 5.31.

B. *4-formylbenzophenone.*—To a solution of 2.5 ml. of concentrated sulfuric acid, 25 ml. of water and 42 ml. of ethanol was added 16 g. (0.05 mole) of the diacetate described above. After heating at the reflux temperature for 35 minutes, the hot solution was filtered and chilled in an ice bath. The resulting yellow crystals were removed by filtration and recrystallized from ethanol to yeld 9 g., 85% yield, of a solid, M.P. 66.5–68° C. The material was dissolved in methylene chloride, washed with a saturated solution of sodium bicarbonate, dried over magnesium sulfate and concentrated to an oil. Addition of petroleum ether caused the oil to solidify and subsequent recrystallization from petroleum ether afforded 4.7 g. of a solid, M.P. 68.5–69.5° C. with previous softening. (Reported M.P. 64° C.)

*Analysis.*—Calc'd. for $C_{14}H_{10}O_2$: C, 79.98; H, 4.79. Found: C, 80.29, 80.28; H, 4.93, 4.79.

C. *4-formylbenzophenone ethylene glycol acetal.*—A mixture of 26 g. (0.124 mole) of 4-formylbenzophenone, prepared as described in Example I(B), 7.7 g. (0.12 mole) of ethylene glycol, 0.2 g. of p-toluenesulfonic acid and 100 ml. of benzene was refluxed while removing the water which was formed. After about one hour the mixture was cooled and 100 ml. of n-hexane was added. This mixture was extracted three times with a saturated sodium bicarbonate solution, filtered and the solvents removed by evaporation. The residue was heated at 100° C. under vacuum to remove the residual solvent. The residual oil, 29 g., 92% yield, solidified to a cream colored solid, M.P. 38–41.5° C. Recrystallization from an ether-petroleum ether mixture raised the melting point to 42.5–43.5° C.

*Analysis.*—Calc'd. for $\bar{C}_{16}H_{14}O_3$: C, 75.57; H, 5.55. Found: 75.56, 75.78; H, 5.71; 5.71.

D. *4-formylbenzophenone polyvinyl acetal.*—A mixture of 45 g. of 86–89% hydrolyzed polyvinyl acetate having a viscosity of 4–6 centipoises for a 4% water solution at 20° C. (a polyvinyl alcohol commercially sold under the trademark of Elvanol 51–05), 78 ml. of acetone and 62 ml. of ethanol was contained in a 500-ml. three-neck flask, suspended in a water bath, fitted with a stirrer and thermometer. While stirring, a solution of 1.8 ml. of sulfuric acid in 140 ml. of acetone was added. The slurry was then heated to 50° C. and 14.7 g. (0.058 mole) of 4-formylbenzophenone ethylene glycol acetal as described in Example I(C) was added. The temperature was held at 50° C. for 1 hour after which heating was discontinued and 100 ml. of acetone was added. When the mixture had cooled to 25° C. the pH was adjusted to 6.0 by adding 85 ml. of a 10% (by volume) solution of triethylamine in acetone. One hundred ml. of acetone was added and the stirring was continued for 10 minutes. The solid was collected on a felt pad in a Büchner funnel and was reslurried and filtered three times using 200 ml. portions of acetone. After air-drying, the light yellow granules weighed 49 g. The product contained about 4 mole percent of this ketoacetal as determined by ultraviolet spectral analysis (255 m$\mu$).

EXAMPLE II

A mixture of 50 ml. of ethanol and 10 g. of 4-formylbenzophenone polyvinyl acetal prepared as described in Example I was heated to boiling. Ten ml. of water was added and the resulting hot, viscous solution was filtered through nainsook. After cooling, two 5-mil thick wet coatings were prepared on glass plates and subsequently air-dried. The plates were exposed through a halftone negative in a vacuum frame for 1 and 2 minutes respectively to a 1800-watt mercury arc lamp at a distance of about 6 inches. The elements were developed by gently brushing in a warm mixture of alcohol-water (70/30 by volume). A firm image in the form of raised dots was obtained in the areas exposed to the actinic radiation for 2 minutes. A similar but slightly softer image was obtained in the areas exposed for 1 minute.

EXAMPLE III

A mixture of 10 g. of 4-formylbenzophenone polyvinyl acetal prepared as described in Example I and 25 ml. of isopropyl alcohol was stirred while 25 ml. of water was added. A solution was obtained by heating the mixture. After filtering through nainsook and cooling, three 3-mil thick wet coatings were made on fixed out glass photographic plates. The plates were exposed through a halftone negative for ½, 1 and 2 minutes respectively as described in Example II. The elements were developed by using a hard spray of hot water to remove the unexposed portions. A firm image in the form of raised dots was obtained in the areas exposed to the actinic radiation.

EXAMPLE IV

To a solution of the mixture described in Example III was added an equal portion of a blue-emitting zinc sulfide phosphor containing 0.28 percent silver and which had been fluxed with a magnesium and barium chloride mixture. The solution was cast as described in Example II, to a depth of 5 mils. After evaporating at room temperature for 25 minutes the solid was exposed to ultraviolet light as described in Example II through a halftone negative. The phosphor containing element was developed by washing out the unexposed portions with a hot water spray as described in Example III. Good, hard, raised dot images were obtained.

EXAMPLE V

The 4-formylbenzophenone polyvinyl acetal composition described in Example II was coated to a thickness of 14 to 18 mils on a tin plated steel support, approximately 11 mils thick, which had been coated with a thin layer of a lacquer composed of a mixture of a vinyl acetate/vinyl chloride copolymer and a phenol/formaldehyde resin. The element was exposed through a halftone negative and subsequently developed by gentle brushing in a warm alcohol-water solution (70/30 by volume. The printing element prepared showed satisfactory image quality and long press life when used for printing in a flat press, the images being neither plugged nor undercut, and maintaining their original dimensions through many impressions.

EXAMPLE VI

*Sulfobenzaldehyde/4-Formylbenzophenone Polyvinyl Acetal*

The sodium salt of ortho-sulfobenzaldehyde, 14.6 g. (0.07 mole) was heated with 62 ml. of acetone until nearly all the salt had dissolved. The solution was completed by adding 64 ml. of acetone and heating. Two ml. (0.036 mole) of sulfuric acid was added and the sodium sulfate that formed was removed by filtration. The filtrate was diluted to 140 ml. with acetone and placed in a 1-liter 3-neck reaction flask containing 44 g. of the polyvinyl alcohol described in Example I(D). The reaction temperature was raised to 50° C. and held for 10 minutes after which 14.7 g. (0.07 mole) of 4-formylbenzophenone ethylene glycol acetal described in Example I(C) was added. (The pH of the reaction mixture was 1.5). After stirring at 50° C. for 1 hour, 100 ml. of acetone was added and the mixture cooled to room temperature. The pH was adjusted to 4.2 by adding 66 ml. of a 10 percent solution (by volume) of triethylamine in acetone. One hundred more milliliters of acetone was added and the mixture filtered through felt in a Büchner funnel. The mixture was reslurried twice in acetone, filtered and air-dried. The mixture was coated to a 5-mil thickness on gelatin-subbed glass and dried. The element was placed in a vacuum frame and exposed for 30 seconds to actinic radiation through a halftone negative as described in Example II. The element was developed by using an alcohol-water solution (70/30 by volume) as described in Example II. Raised dot images were obtained in the exposed areas. A second element was exposed at atmospheric pressure for one minute through a perforated steel plate. Firm images were present in the exposed areas after alcohol-water development. A similar reaction as described above but using 1.8 ml. (0.033 mole) of sulfuric acid and 12.7 g. (0.05 mole) of 4-formylbenzophenone ethylene glycol acetal resulted in a product that was more water soluble. The mixture was coated as described above. The elements were exposed for 15 seconds to ultraviolet light and developed in an alcohol-water solution (50/50 by volume). Raised images similar to those described above were obtained in the areas which had been exposed.

EXAMPLE VII 4-formylbenzophenone polyvinyl acetal in an ethanol-water solution (80/20 by volume) to give a 20 percent by weight solution of the acetal was cast on an aluminum plate provided with a paper dam so that after evaporation a tough, clear, flexible sheet of about 50-mil thickness was formed. The sheet was bonded to the aluminum plate by means of an adhesive consisting of a butadiene/acrylonitrile copolymer combined with a phenol/formaldehyde resin (this combination is an adhesive that is largely thermoplastic but has a small amount of thermosetting effect also). The sandwich formed was pressed at 100° C. between 48-mil spacers for 1 minute at 200 p.s.i. The adhesive also served as an antihalation layer. The element was exposed through a negative for 3 minutes to actinic radiation as described in Example II. The unexposed portions were washed out by washing in an ethanol-water solution (50/50 by volume). Clear, tough images 14–18 mils thick were present in the exposed areas after development. The resulting printing plate showed excellent image quality and long press life when used for printing in a flat bed press.

EXAMPLE VIII

*4-Formylacetophenone Polyvinyl Acetal*

A. *p-Acetylbenzaldiacetate.*—Chromium trioxide, 53 g. (0.53 mole) was dissolved in a mixture of 570 ml. of glacial acetic acid and 570 ml. of acetic anhydride contained in a 2 liter three-neck flask. The stirred mixture was cooled to 10° C., 48.3 g. (0.36 mole) of p-methylacetophenone was added and the mixture was cooled to −5° C. in an ice-salt bath. Sulfuric acid, 46 ml. was added at such a rate that the reaction temperature was kept at 1 to 5° C. Approximately 40 minutes addition time was required. The mixture was poured on ice contained in two 3-liter beakers (about ½ full) and was diluted with cold water. The resulting oil was extracted with methylene chloride and then neutralized with sodium bicarbonate. Concentration of the organic extract afforded an oil which solidified on cooling to give 38.5 g. of a sticky solid. Crystallization from methanol yielded 16.3 g., 18% yield, of a white solid, M.P. 51–62° and after recrystallization, M.P. 63–64° C.

*Analysis.*—Calc'd. for $C_{13}H_{14}O_5$: C, 62.39; H, 5.64. Found: C, 62.71, 62.89; H, 5.74, 5.77.

In addition, the diacetate was converted to the aldehyde, M.P. 33–35° C. (reported 33–34° C.) by hydrolyzing with sulfuric acid by a procedure described in Example I(B).

B. *4-formylacetophenone polyvinyl acetal.*—The procedure was similar to that described in Example I–D except that the following reagents were used:

11.4 g., 0.046 mole, p-acetylbenzal diacetate
78 ml. acetone
62 ml. ethyl alcohol
30 ml. water
1.8 ml. sulfuric acid in 100 ml. acetone
44 g. polyvinyl alcohol described in Example I(D)

The product was isolated as a light yellow granular solid, 51 g. The product contained about 5 mole percent of this ketoacetal as determined by ultraviolet spectral analysis (247 mμ).

EXAMPLE IX

A clear film, 7 mils thick, was obtained by casting on a glass plate an ethanol-water solution (2.5 to 1 by volume) containing 4 g. of 4-formylacetophenone polyvinyl) acetal, 16 g. of aqueous ethanol (2.5 pts. ethanol and 1 part water), 0.04 g. benzyl alcohol and 2 drops of acetic acid. The film was exposed for 5 minutes to a 125 watt, 60 cycle, Hanovia type mercury arc light at a distance of 6 inches through a black paper stencil with cut out areas. Development in the solvent described above at room temperature afforded a raised image in the exposed areas. The image was firm but was softer than the image obtained from the related benzophenone polymer.

In like manner, polyvinyl acetals can be made from 4-formyl-4′-methoxybenzophenone, 4-formyl-4′-methylbenzophenone, 4-formyl-4′-chlorobenzophenone, 4-formyl-alpha-phenylacetophenone and 4-formyl-2-naphthophenone. The various precursors for these and intermediates can be made from the corresponding homologues and analogues in like manner.

It has been found that certain physical properties of the insolubilizable layers can be improved, e.g., solubility in washout solutions, adhesion, flexibility, etc., if mixed polyvinyl acetals are prepared from, e.g., 4-formylbenzophenone ethylene glycol acetal and orthosulfobenzaldehyde (see example VI) or the former with benzaldehyde, butyraldehyde and hydroxybenzaldehyde. The hydroxy benzaldehyde mixed polyvinyl acetal is soluble in a more dilute alcohol-water solution, e.g., 50/50 by volume, while the mixed polyvinyl acetals prepared from benzaldehyde and butyraldehyde are more soluble in suitable solvents, e.g., acetone, dioxane and ester and ketonic solvents. If desired, polyvinyl alcohol and polyvinyl esters and acetals can be admixed with the 4-formyl acetals.

The novel compositions of matter because they can undergo insolubilization are useful in the preparation of offset and relief-image printing elements. The printing elements comprise an adhesive coated base support coated with a layer of said insolubilizable compositions. The thickness of the insolubilizable layer can range from about 0.2–250 mils, preferably 0.5–80 mils in thickness.

The insolubilizable layers can also contain immiscible polymeric or non-polymeric, organic or inorganic fillers or reinforcing agents which form essentially transparent compositions, e.g., the organophilic silicas, the bentonites, silica, powdered glass, and the like, having a particle size less than 0.4 mil in their maximum dimension, and in amounts varying with the desired properties and thicknesses of the layers. Similarly, dyes and pigments, which do not appreciably absorb light at the wave length being used for exposure, can be incorporated in the insolubilizable layers. Suitable dyes include Fuchsine (CI 42510), Calcocid Green S (CI 44090), Solvent Yellow 34 (CI 41000B), etc. Suitable pigments include $TiO_2$, colloidal carbon, graphite, ceramics, clays, phosphor particles, and metal powders, e.g., aluminum, magnetic iron, copper, etc. The insolubilizable compositions, even when containing plasticizers and monomeric or polymeric fillers, reinforcing agents, dyes or pigments as described above, are solids. While their hardness varies, in flexible sheet form their surfaces are substantially nondeformable under ordinary conditions and generally are non-tacky.

Antihalation materials, e.g., dyes or pigments, can be placed beneath or in operative association with the lower surface of the insolubilizable layer. There should be a sufficient quantity of such material so that less than 35% of actinic light incident on the material is reflected into the insolubilizable layer. Suitable antihalation pigments include carbon black, manganese dioxide, dyes, e.g., Acid Blue, Black (Colour Index 42755) and Acid Magenta O (Colour Index 42685).

Adhesive compositions that are useful in bonding the light-sensitive layer to the base support are disclosed in assignee's Burg U.S. application Ser. No. 750,868, filed July 25, 1958, e.g., copolyesters and polyesters composed of the esterification product of a glycol of 2 to 10 carbon atoms and a mixture of esters of (*a*) hexahydroterephthalic, terephthalic and sebacic acids, (*b*) terephthalic, isophthalic and sebacic acids and (*c*) terephthalic and sebacic acids and of esters of (*d*) hexahydroterephthalic acid.

The insolubilization reaction occurs when the composition is exposed to an actinic light source. Such sources include carbon arcs, mercury-vapor arcs, fluorescent lamps with special ultraviolet-light-emitting phosphors, argon glow lamps, and photographic flood lamps. Of these, the mercury-vapor arcs, particularly the sun-lamp type and the fluorescent sun-lamps, are most suitable. The sun-lamp mercury-vapor arcs are customarily used at a distance of 1.5 to 10 inches from the insolubilizable layer.

The new compositions of matter taught by this invention are useful in the preparation of printing elements prepared by an insolubilization reaction in the presence of actinic radiation. The printing elements are useful in photoengraving and lithography, e.g., in the preparation of collotype, planographic type, relief-image and offset printing elements. The insolubilized compositions are also useful as television phosphor photobinders and photo-resists, e.g., printed circuit resist. The compositions are useful in the preparation of magenta screens, stencils, e.g., screen stencils; dyeable images (halftone and continuous), in direct positive and negative systems utilizing wet development which incorporate color formers and coupling agents and in vapor developed systems, in which are incorporated diazonium salts and coupling agents.

The printing reliefs made in accordance with this invention can be used in all classes of printing but are most applicable to those classes of printing wherein a distinct difference of height between printing and non-printing areas is required. These classes include those wherein the ink is carried by the raised portion of the relief such as in dry-offset printing ordinary letterpress printnig, the latter requiring greater height differences betwen printing and non-printing areas, and those wherein the ink is carried by the recessed portions of the relief such as in intaglio printing, e.g., line and inverted halftone. The elements are also useful in multicolor printing. As is apparent from the above, they are useful in making visible contrast images.

An advantage of the compounds of the present invention is that they insolubilize rapidly even in the presence of air and in themselves are capable of forming tough images and coatings. In addition, they may be insolubilized still more rapidly in the presence of a hydrogen donor compound, preferably alcohols, e.g., benzyl alcohols, to give sharp, tough, desirable images of great depth, as in printing plate applications. The insolubilization can be carried out in the presence of aerial oxygen and because it is possible to have two or more hydroxyl groups or other water-sensitive groups, e.g., sulfonic acid groups, on the polymer chain, the compounds after exposure can be developed in non-toxic solvents, e.g., hot water, water-alcohol, dilute alkali or other aqueous solutions.

What is claimed is:

1. Polyvinyl acetals containing a plurality of intralinear —$CH_2$CHOH— groups and a plurality of groups of the formula:

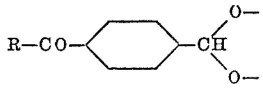

wherein the free bonds are attached to intralinear carbon atoms of the polyvinyl chain of atoms, and R is a member taken from the group consisting of methyl, aralkyl, aryl, p-chloro-, p-sulfo-, sodium p-sulfo-, p-alkoxy- and p-alkylphenyl wherein alkyl contains 1–4 carbons, alpha-chlornaphthyl and alpha-alkoxynaphthyl, wherein the alkoxy groups contain 1 to 2 carbon atoms, said acetals containing 10% to 80% —$CH_2$CHOH— groups and 5% to 75% of acetal groups of the foregoing structural formula, said acetals having water-soluble properties and being photosensitive.

2. Polyvinyl acetals containing (1) 10% to 80% intralinear —$CH_2$CHOH— groups, (2) 5% to 75% groups of the formula:

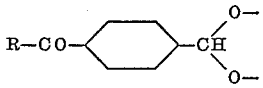

wherein the free bonds are attached to intralinear carbon atoms of the polyvinyl chain of atoms, and R is a member taken from the group consisting of methyl, aralkyl, aryl, p-chloro-, p-sulfo-, sodium p-sulfo-, p-alkoxy- and p-alkylphenyl wherein alkyl contains 1–4 carbons, alpha-chlornaphthyl and alpha-alkoxynaphthyl, wherein the alkoxy groups contain 1 to 2 carbon atoms, and (3) up to 50% sodium o-sulfobenzaldehyde acetal groups, said acetals having photosensitive and water-soluble properties.

3. 4-formylacetophenone polyvinyl acetal containing 10% to 95% —$CH_2$CHOH— groups.

4. 4 - formylacetophenone/sodium - o - sulfobenzaldehyde polyvinyl acetals containing 10% to 90%

—$CH_2$CHOH— groups.

5. 4-formylbenzophenone polyvinyl acetal containing 10% to 95% —$CH_2CHOH$— groups.

6. 4 - formylbenzophenone/sodium - o - sulfobenzaldehyde polyvinyl acetals containing 10% to 90%

—$CH_2CHOH$— groups.

7. 4-formylbenzophenone ethylene glycol acetal.

8. A photosensitive composition comprising an alcohol as a hydrogen donor compound and a polyvinyl acetal containing a plurality of intralinear

—$CH_2CHOH$— groups and a plurality of groups of the formula:

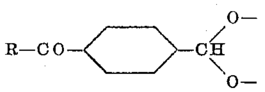

wherein the free bonds are attached to intralinear carbon atoms of the polyvinyl chain of atoms and R is a member taken from the group consisting of methyl, aralkyl, aryl, p-chloro-, p-sulfo-, sodium p-sulfo-, p-alkoxy- and p-alkylphenyl wherein alkyl contains 1–4 carbons, alpha-chlornaphthyl and alpha-alkoxynaphthyl, wherein the alkoxy groups contain 1 to 2 carbon atoms, said acetals containing 10% to 80% —$CH_2CHOH$— groups and 5% to 75% of acetal groups of the foregoing structural formula, said acetals having water-soluble properties and being photosensitive.

9. A photosensitive composition comprising an alcohol as a hydrogen donor compound and a polyvinyl acetal containing (1) 10% to 80% intralinear —$CH_2CHOH$— groups, (2) 5% to 75% groups of the formula:

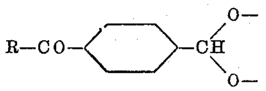

wherein the free bonds are attached to intralinear carbon atoms of the polyvinyl chain of atoms, and R is a member taken from the group consisting of methyl, aralkyl, aryl, p-chloro-, p-sulfo-, sodium p-sulfo-, p-alkoxy- and p-alkylphenyl wherein alkyl contains 1–4 carbons, alpha-chlornaphthyl and alpha-alkoxynaphthyl, wherein the alkoxy groups contain 1 to 2 carbon atoms, and (3) up to 50% sodium o-sulfobenzaldehyde acetal groups, said acetals having photosensitive and water-soluble properties.

10. A composition as defined in claim 8 wherein said acetal is a 4-formylacetophenone polyvinyl acetal containing 10% to 95% —$CH_2CHOH$ groups.

11. A composition as defined in claim 8 wherein said acetal is a 4-formylbenzophenone polyvinyl acetal containing 10% to 95% —$CH_2CHOH$ groups.

References Cited in the file of this patent

UNITED STATES PATENTS 2,831,768 Merrill et al. ____________ Apr. 22, 1958

FOREIGN PATENTS 522,683 Canada ________________ Mar. 13, 1956